US 11,451,712 B2

(12) United States Patent
Watanabe et al.

(10) Patent No.: US 11,451,712 B2
(45) Date of Patent: Sep. 20, 2022

(54) ELECTRONIC DEVICE

(71) Applicant: CANON KABUSHIKI KAISHA, Tokyo (JP)

(72) Inventors: Kazuhiro Watanabe, Tokyo (JP); Harry Vermeulen, Tokyo (JP); Takeshi Kikkawa, Kanagawa (JP); Soshi Takita, Kanagawa (JP); Takeshi Nakata, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/354,266

(22) Filed: Jun. 22, 2021

(65) Prior Publication Data
US 2021/0352218 A1 Nov. 11, 2021

Related U.S. Application Data

(63) Continuation of application No. PCT/JP2019/048306, filed on Dec. 10, 2019.

(30) Foreign Application Priority Data

Dec. 25, 2018 (JP) .............................. JP2018-241258
Dec. 25, 2018 (JP) .............................. JP2018-241413

(51) Int. Cl.
H04N 5/232 (2006.01)
H04N 1/00 (2006.01)
(Continued)

(52) U.S. Cl.
CPC ....... H04N 5/232935 (2018.08); G06F 3/005 (2013.01); H04N 1/00384 (2013.01);
(Continued)

(58) Field of Classification Search
CPC .......... H04N 1/00384; H04N 1/32106; H04N 1/32128; H04N 5/23216; H04N 5/23245;
(Continued)

(56) References Cited

U.S. PATENT DOCUMENTS 11,070,734 B2 * 7/2021 Watanabe ........... G06F 3/04883
2002/0060740 A1 * 5/2002 Kato .................... H04N 5/7755
348/231.6
2015/0049234 A1 2/2015 Jung

FOREIGN PATENT DOCUMENTS

JP 2002-051292 A 2/2002
JP 2003-298982 A 10/2003
(Continued)

OTHER PUBLICATIONS

The US Publication and foreign references 1-3 and 5-6 were cited in the International Search Report dated Mar. 17, 2020 of International Application No. PCT/JP2019/048306, which is enclosed.

Primary Examiner — Daniel M Pasiewicz
(74) Attorney, Agent, or Firm — Cowan, Liebowitz & Latman, P.C.

(57) ABSTRACT

An electronic device according to the present invention includes at least one memory and at least one processor which function as: a recording control unit configured to perform control to start recording content including at least one of a moving image and sound in response to an operation of a first operating member or a second operating member; and a control unit configured to perform control to: record the content as content of a new group that differs from a group of content recorded immediately prior thereto in a case where recording of the content is started in response to receipt of an operation of the first operating member; and record the content as content of the same group as the content recorded immediately prior thereto in a case where (Continued)

recording of the content is started in response to receipt of an operation of the second operating member.

18 Claims, 9 Drawing Sheets

(51) Int. Cl.
*H04N 5/225* (2006.01)
*H04N 1/32* (2006.01)
*G06F 3/00* (2006.01)
*H04N 101/00* (2006.01)

(52) U.S. Cl.
CPC ....... *H04N 5/2251* (2013.01); *H04N 5/23216* (2013.01); *H04N 5/23245* (2013.01); *H04N 1/32106* (2013.01); *H04N 1/32128* (2013.01); *H04N 2101/00* (2013.01); *H04N 2201/3226* (2013.01); *H04N 2201/3247* (2013.01); *H04N 2201/3267* (2013.01)

(58) Field of Classification Search
CPC ............. H04N 5/2251; H04N 2101/00; H04N 2201/3226–3229; H04N 2201/3247; H04N 2201/3267
See application file for complete search history.

(56) References Cited

FOREIGN PATENT DOCUMENTS

| | | |
|---|---|---|
| JP | 2010-504601 A | 2/2010 |
| JP | 2011-071813 A | 4/2011 |
| JP | 2016-224687 A | 12/2016 |
| WO | 2013-183338 A1 | 12/2013 |

* cited by examiner

ELECTRONIC DEVICE

CROSS-REFERENCE TO RELATED APPLICATIONS

This application is a Continuation of International Patent Application No. PCT/JP2019/048306, filed Dec. 10, 2019, which claims the benefit of Japanese Patent Application No. 2018-241258, filed Dec. 25, 2018, and Japanese Patent Application No. 2018-241413, filed Dec. 25, 2018, which are hereby incorporated by reference herein in their entirety.

BACKGROUND OF THE INVENTION

Field of the Invention

The present invention relates to an electronic device that handles content such as images, video, and sound.

Background Art

Typically, in a site where content (material) such as images, video, and sound is created, when a moving image that is not suitable as material, such as a speaking error during narration or a mistake during camera work, is recorded, the image is recaptured, or in other words a "retake" is performed.

PTL 1 discloses a technique (a magnetic recording and playback apparatus) for performing a retake in response to a retake command so that a recorded moving image (a moving image recorded during a take (a first image capture operation) or the like) is overwritten by a new moving image. PTL 2 discloses a technique (an image capture apparatus) that allocates captured image data to the same group as image data captured immediately prior thereto.

Further, when editing content such as images, video, and sound, typically, a plurality of thumbnail images corresponding respectively to a plurality of pieces of content are arranged and displayed along a single axis in the playback order of the content, whereupon the thumbnail images are moved, switched, added, deleted, and so on in response to user operations. This type of editing is known as "timeline editing" or the like.

PTL 3 discloses a technique (a moving image content editing apparatus) for arranging and displaying a plurality of content objects within a three-dimensional space in accordance with the time of each content object (the time at which the corresponding moving image was captured) and tag information (information relating to the content of the moving image).

In the prior art, however, the content cannot be managed favorably, and therefore user-friendliness is poor. For example, with the technique disclosed in PTL 1, retakes are performed so that a moving image recorded during a take is overwritten by a new moving image, making it impossible to manage both the moving image recorded during the take and the moving image recorded during the retake. With the technique disclosed in PTL 2, the current image capture operation is not limited to a retake of the immediately preceding image capture operation, and in this case, the captured image data should not be allocated to the same group as the image data captured immediately prior thereto. With the technique disclosed in PTL 3, the user cannot easily ascertain the correspondence relationship between the moving image recorded during the take (the first image capture operation) and the moving image recorded during the retake and so on simply by looking at the plurality of displayed content objects. Hence, timeline editing is difficult.

CITATION LIST

Patent Literature

PTL 1 Japanese Patent Application Publication No. 2002-51292
PTL 2 Japanese Patent Application Publication No. 2003-298982
PTL 3 Japanese Patent Application Publication No. 2011-071813

SUMMARY OF THE INVENTION

The present invention records a plurality of content so that the content is managed favorably, and displays images representing the content favorably so that user-friendliness is improved.

An electronic device according to the present invention includes at least one memory and at least one processor which function as: a recording control unit configured to perform control to start recording content including at least one of a moving image and sound in response to an operation of a first operating member or a second operating member; and a control unit configured to perform control to: record the content as content of a new group that differs from a group of content recorded immediately prior thereto in a case where recording of the content is started in response to receipt of an operation of the first operating member; and record the content as content of the same group as the content recorded immediately prior thereto in a case where recording of the content is started in response to receipt of an operation of the second operating member.

Further features of the present invention will become apparent from the following description of exemplary embodiments with reference to the attached drawings.

DESCRIPTION OF THE EMBODIMENTS

Figure 1:
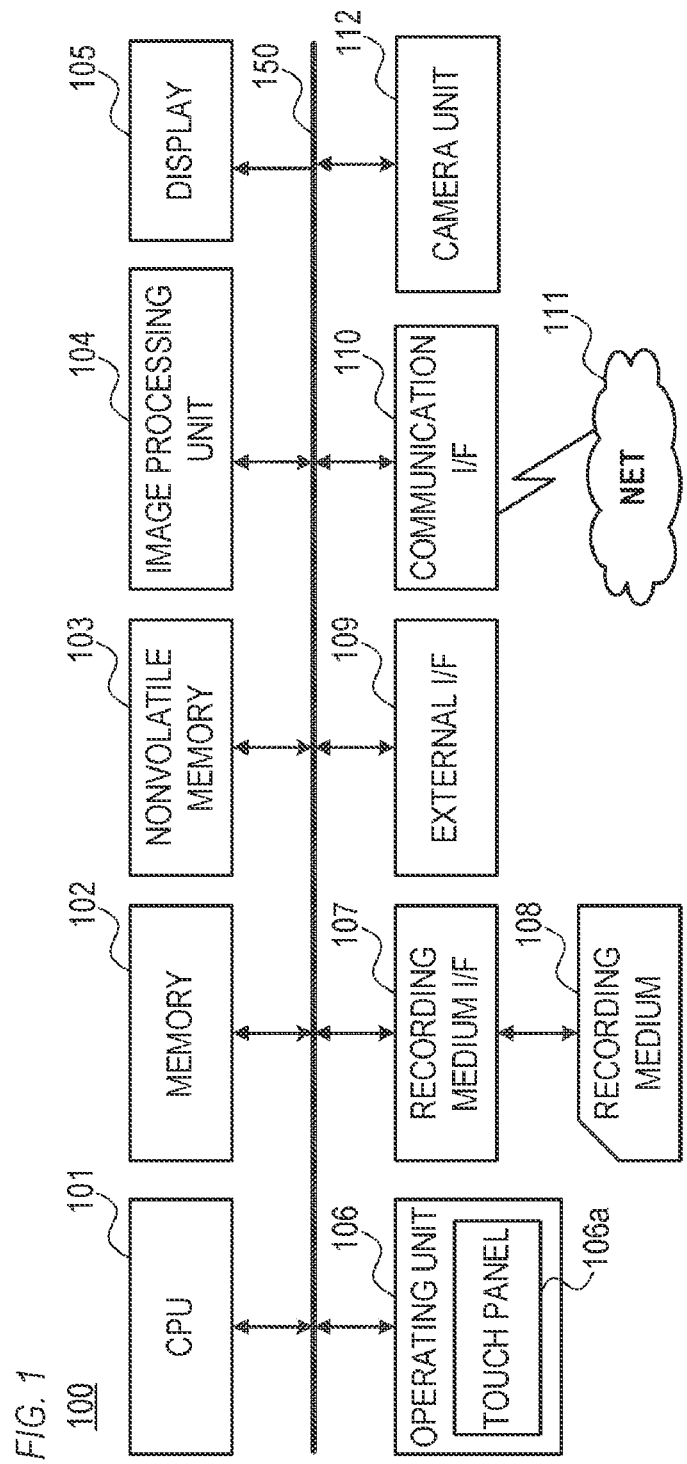
FIG. 1 is a block diagram of an electronic device.

An embodiment of the present invention will be described below on the basis of the figures. FIG. 1 is a block diagram showing an example configuration of an electronic device 100 serving as an example of an apparatus to which the present invention can be applied. The electronic device 100 can be configured using a personal computer (PC hereafter) or the like.

In FIG. 1, a CPU 101, a memory 102, a nonvolatile memory 103, an image processing unit 104, a display 105, an operating unit 106, a recording medium I/F 107, an external I/F 109, a communication I/F 110, and a camera unit 112 are connected to an internal bus 150. The respective parts connected to the internal bus 150 are configured to be capable of exchanging data with each other via the internal bus 150.

The CPU 101 includes one or a plurality of processors and/or at least one circuit. The memory 102 is constituted by a RAM (a volatile memory using a semiconductor element or the like), for example. The CPU 101 controls the respective parts of the electronic device 100 in accordance with a program stored in the nonvolatile memory 103, for example, using the memory 102 as a work memory. The nonvolatile memory 103 stores image data, sound data, and other data, various programs used by the CPU 101 to perform operations, and so on. The nonvolatile memory 103 is constituted by a hard disk (HD), a ROM, or the like, for example.

The image processing unit 104 implements various types of image processing on image data stored in the nonvolatile memory 103 or the recording medium 108, a video signal acquired via the external V/F 109, image data acquired via the communication I/F 110, a captured image, and the like on the basis of the control of the CPU 101. The image processing performed by the image processing unit 104 includes A/D conversion processing, D/A conversion processing, image data encoding processing, compression processing, decoding processing, enlargement/reduction processing (resizing), noise reduction processing, color conversion processing, and so on. The image processing unit 104 may be constituted by a dedicated circuit block for implementing specific image processing. Further, depending on the type of image processing, the image processing can also be implemented by the CPU 101 in accordance with a program instead of using the image processing unit 104.

The display 105 displays images, a GUI screen forming a GUI (Graphical User Interface), and the like on the basis of the control of the CPU 101. The CPU 101 controls the respective parts of the electronic device 100 to generate a display control signal in accordance with a program, generate a video signal to be displayed on the display 105, and output the video signal to the display 105. The display 105 displays a video on the basis of the output video signal. Note that only an interface for outputting the video signal to be displayed on the display 105 is required as a configuration provided in the electronic device 100 itself, and the display 105 may be constituted by an external monitor (a television or the like).

The operating unit 106 is an input device for receiving user operations, and includes an alphanumeric character information input device such as a keyboard, a pointing device such as a mouse or a touch panel, buttons, a dial, a joystick, a touch sensor, a touchpad, and so on. Note that a touch panel is an input device that is formed in planar form so as to overlap the display 105 and outputs coordinate information corresponding to a contacted position thereon.

The recording medium I/F 107 is formed so that the recording medium 108, which is constituted by a memory card, a CD or a DVD, can be attached thereto, and on the basis of the control of the CPU 101, the recording medium I/F 107 reads data from the attached recording medium 108 and writes data to the recording medium 108. The external I/F 109 is an interface that is connected to an external device by a wire cable or wirelessly in order to input and output video signals and sound signals. The communication I/F 110 is an interface that communicates with an external device, the Internet 111, or the like in order to transmit and receive various data such as files and commands.

The camera unit 112 is a camera unit constituted by an imaging element (an image sensor) or the like, which is formed from a CCD, a CMOS, or the like that converts an optical image into an electric signal. The camera unit 112 includes a lens group (an imaging lens) including a zoom lens and a focus lens, a shutter having an aperture function, an imaging element, an A/D converter for converting an analog signal output from the imaging element into a digital signal, and a barrier that covers the imaging system to prevent soiling and damage. The image processing unit 104 performs predetermined pixel interpolation, resizing processing. i.e., reduction, and color conversion processing on data captured and thus acquired by the camera unit 112. On the basis of calculation results acquired by the image processing unit 104, the CPU 101 performs exposure control, distance measurement control, and AWB (auto w % bite balance) processing. Display image data captured by the camera unit 112 and image-processed by the image processing unit 104 are displayed by the display 105. By converting digital signals captured by the camera unit 112, converted by the A/D converter, and stored in the memory 102 into analog signals using a D/A converter and then successively transferring the resulting analog signals to the display 105 in order to be displayed thereon, live view display (LV display) can be performed. A live view can be displayed in an image capture standby state for static images, an image capture standby state for moving images, and while recording a moving image, and a captured object image is displayed substantially in real time. The CPU 101 controls the camera unit 112 and the image processing unit 104 so that operations for AF (auto focus) processing, AE (automatic exposure) processing, AWB processing, and so on are started in response to image capture preparation instructions based on user operations performed on the operating unit 106. In response to an image capture instruction, the CPU 101 performs control to start a series of image capture processing (main image capture) operations for reading a signal from the imaging element by performing main exposure, generating an image file by performing image processing on the captured image using the image processing unit 104, and recording the result in the recording medium 108. The image capture instruction can be issued by a user operation on the operating unit 106. The camera unit 112 is capable of capturing both static images and moving images.

The electronic device 100 also includes a microphone (not shown) that collects sounds from a recorded moving image, voices recorded by a voice recorder function, call voices occurring when a call function is used, and so on. The electronic device 100 further includes a speaker (not shown) that is used to emit playback sound by reproducing sounds from a recorded moving image file, voices from a voice file, and so on, and to emit the voice of a call destination during a call. The electronic device 100 further includes a sound output unit (not shown) for outputting similar sounds to headphones or the like.

The operating unit 106 includes a touch panel 106a. The CPU 101 is capable of detecting the following operations or states input into the touch panel 106a.

A finger or a pen that has not yet touched the touch panel 106a newly touches the touch panel 106a, or in other words, a touch begins (referred to hereafter as a Touch-Down)

The finger or pen is in a state of touching the touch panel 106a (referred to hereafter as a Touch-On)

The finger or pen is moved while still touching the touch panel 106a (referred to hereafter as a Touch-Move)

The finger or pen touching the touch panel 106a is removed from the touch panel 106a, or in other words, the touch ends (referred to hereafter as a Touch-Up)

Nothing touches the touch panel 106a (referred to hereafter as a Touch-Off)

When a Touch-Down is detected, a Touch-On is detected at the same time. Normally, following a Touch-Down, a Touch-On is detected continuously until a Touch-Up is detected. Likewise when Touch-Move is detected, a Touch-On is detected at the same time. Even when a Touch-On is detected, a Touch-Move is not detected unless the touch position moves. When it is detected that all touching fingers and pens have performed a Touch-Up, a Touch-Off is detected.

The CPU 101 is notified of these operations and states, as well as the coordinates of the position in which the finger or pen is touching the touch panel 106a, via the internal bus, and on the basis of the notified information, the CPU 101 determines the nature of the operation (the touch operation) being performed on the touch panel 106a. With regard to a Touch-Move, the movement direction in which the finger or pen moves over the touch panel 106a can be determined for each vertical component and each horizontal component on the touch panel 106a on the basis of variation in the position coordinates. When a Touch-Move of at least a predetermined distance is detected, it is determined that a sliding operation has been performed. An operation in which a finger is moved quickly by a certain distance while touching the touch panel 106a and then lifted away from the touch panel 106a is known as a flick. In other words, a flick is an operation for quickly stroking the touch panel 106a with a finger in a flicking motion. When a Touch-Move of at least a predetermined distance and at least a predetermined speed is detected and a Touch-Up is detected immediately thereafter, it can be determined that a flick has been performed (it can be determined that a flick has been performed following a sliding operation). Further, a touch operation in which a plurality of locations (two points, for example) are touched simultaneously and the touch positions are brought closer together is known as a pinch-in, while a touch operation in which the touch positions are moved away from each other is known as a pinch-out. A pinch-in and a pinch-out are referred to collectively as a pinching operation (or simply as a pinch).

The touch panel 106a may use any of various systems, such as a resistive film system, an electrostatic capacitance system, a display acoustic wave system, an infrared system, an electromagnetic induction system, an image recognition system, or an optical sensor system. Either a system that detects contact with the touch panel as a touch or a system that detects the approach of a finger or a pen toward the touch panel as a touch may be used.

Figure 2:
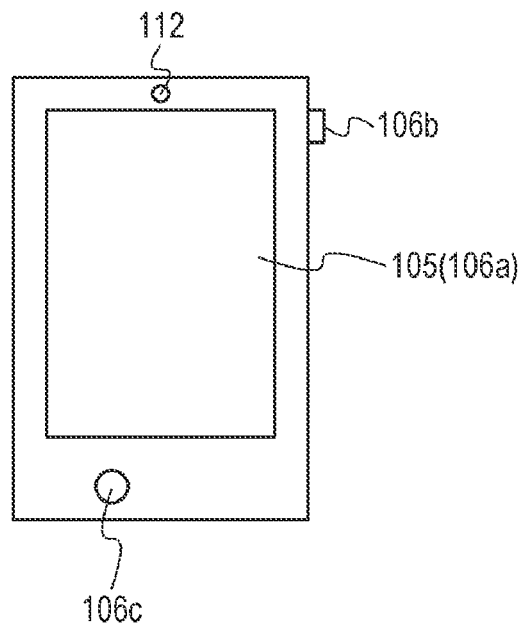
FIG. 2 is an external view of an electronic device (a smartphone)
Figure 3:
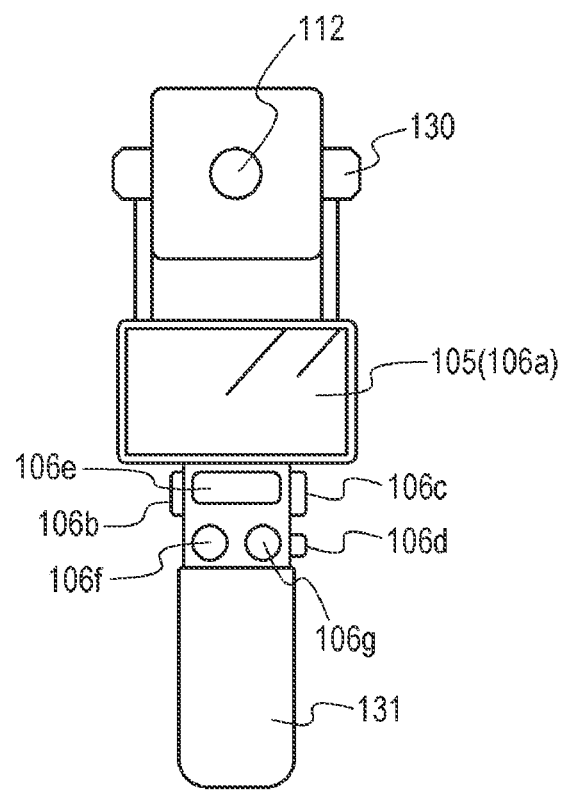
FIG. 3 is an external view of an electronic device (a digital camera)

FIGS. 2 and 3 are external views of the electronic device 100. FIG. 2 shows an example of a case in which a smartphone is used as the electronic device 100, and FIG. 3 shows an example of a case in which the electronic device 100 is a digital camera specialized for self-photography in which the photographer (or operator) photographs him/herself. Note that internal block diagrams in both of these cases are similar to FIG. 1, and therefore description of the internal block diagrams has been omitted.

The electronic device 100 (the smartphone) of FIG. 2 includes, as parts of the operating unit 106, a power supply button 106b and a home button 106c. The power supply button 106b is a button for switching a power supply of the electronic device 100 ON/OFF. The home button 106c is a button for switching to a list screen (a home screen) listing application software that can be activated.

The camera unit 112 is provided in an upper portion of the electronic device 100 (the digital camera) of FIG. 3. The camera unit 112 is coupled to a main body portion by a hinge portion 130 so that the camera unit 112 can be rotated freely using the hinge portion 130 as a central axis. An appropriate degree of frictional force is set to act during rotation so that the user can rotate the camera unit 112 to and fix the camera unit 112 in a desired orientation. The image capture orientation (the image capture direction) of the camera unit 112 can thus be set in a facing orientation (the illustrated orientation) in which the photographer holding the electronic device 100 can photograph him/herself as an object. The image capture direction can also be set in the opposite orientation to the facing orientation, for example the opposite direction to the direction of the photographer as seen from the electronic device 100. In this embodiment, the electronic device 100 is assumed to include the touch panel 106a that is capable of detecting touch operations on the display 105, but a digital camera such as that shown in FIG. 3 does not have to include the touch panel 106a.

The power supply button 106b and the home button 106c of FIG. 3 have similar functions to the functions illustrated in FIG. 2. A menu button 106d is a hard key having a similar function to a menu button 406 (a touch button) to be described below. A touchpad 106e is a touch sensor that is capable of detecting various touch operations on an operating surface of the touchpad 106e, similarly to the touch panel 106a. Similar processing to that of touch operations performed on a touchpad area 402, to be described below, is performed in response to touch operations on the touchpad 106e. The operating surface of the touchpad 106e is disposed in a different position to the display surface of the display 105 and does not have a display function. A take key 106f is a hard key having a similar function to a take key 404 (a touch button) to be described below. A retake key 106g is a hard key having a similar function to a retake key 405 (a touch button) to be described below. A grip portion 131 is a grip portion by which the electronic device 100 can be held with one hand, and the grip portion 131 is formed from a rubber material, a sponge material, or the like in order to improve the holding force.

In FIG. 3, when the user (the photographer) holds the grip portion 131 with one hand, the user can operate the take key 106f, the retake key 106g, and the touchpad 106e with the thumb of the hand holding the grip portion 131. Hence, the user can perform various image capture operations to be described below while holding the electronic device 100 (the digital camera) with one hand, holding an object to be photographed or the like with the other hand, and using the object held in the other hand and him/herself as the object. Furthermore, the user can operate the take key 106f, the retake key 106g, the touchpad 106e, and so on smoothly, without switching the hand holding the electronic device 100. Note that the touchpad 106e and so on may be disposed in any position allowing operation thereof by the fingers used to operate the take key 106f and the retake key 106g. Moreover, the grip portion 131 does not have to be held in the hand, and operations may be performed by a finger rather than by the thumb.

Moreover, in FIG. 3, the take key 106f and the retake key 106g are disposed further away than the display 105 when seen from acquisition units such as the camera unit 112 and the microphone (not shown). Thus, situations in which the finger operating the take key 106f or the retake key 106g catches on the camera unit 112 or the microphone, thereby obstructing image capture or sound collection, or catches on the display 105, thereby obstructing viewing of a display screen on the display 105, can be suppressed. In this embodiment, image capture and sound collection instructions are issued using the take key 106f and the retake key 106g, and during image capture and sound collection, live view display is performed on the display 105. Therefore, by disposing the take key 106f and the retake key 106g further away than the display 105 when seen from the camera unit 112 and the microphone, the user can issue an instruction to capture a moving image favorably while comfortably checking the live view display. Furthermore, image capture and sound collection can be performed favorably without the finger operating the take key 106f or the retake key 106g being photographed or sound generated by the finger being input.

A case in which a smartphone such as that of FIG. 2 is used as the electronic device 100 will be described below, but similar processing to the various types of processing described below can also be performed by a digital camera such as that of FIG. 3. In a case where a digital camera such as that of FIG. 3 is used as the electronic device 100, the take key 404, the retake key 405, and the touchpad area 402, all of which will be described below, may be read respectively as the take key 106f, the retake key 106g, and the touchpad 106e. Further, an LV display area 401 and a timeline display area 420 to be described below can be set as the entire surface of the display 105.

Figure 4A:
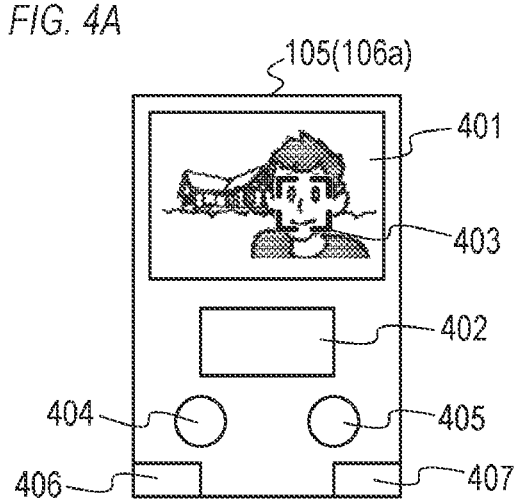
FIG. 4A shows an example of an image capture standby screen.
Figure 4B:
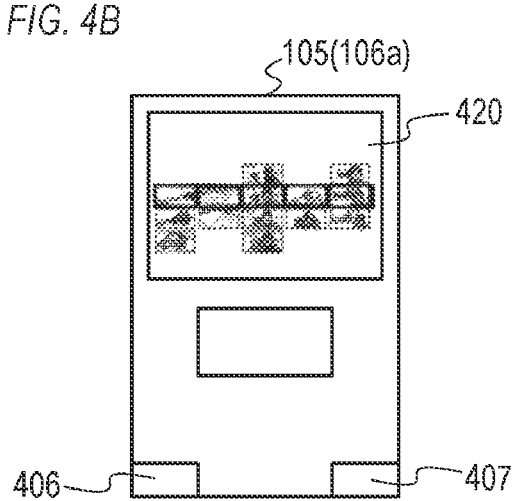
FIG. 4B shows an example of an editing screen.
Figure 4C:
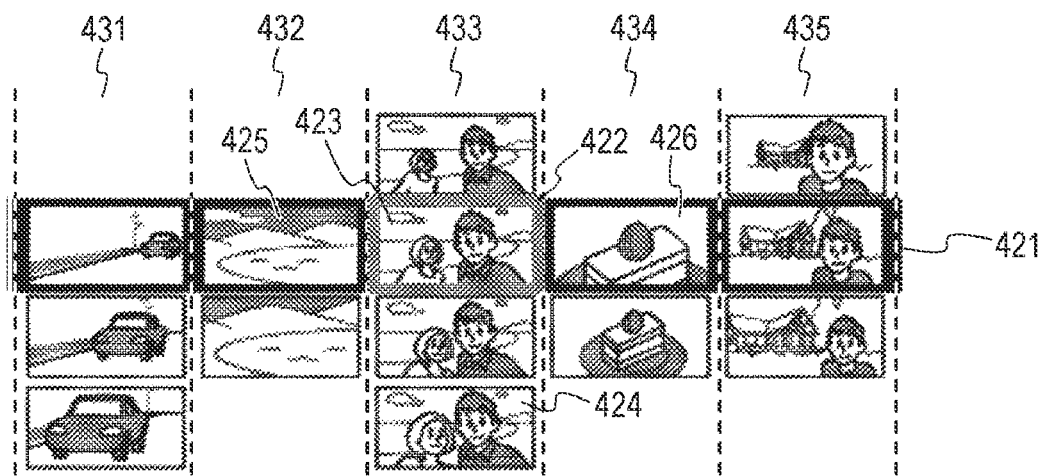
FIGS. 4C to 4E show examples of timeline display.
Figure 4D:
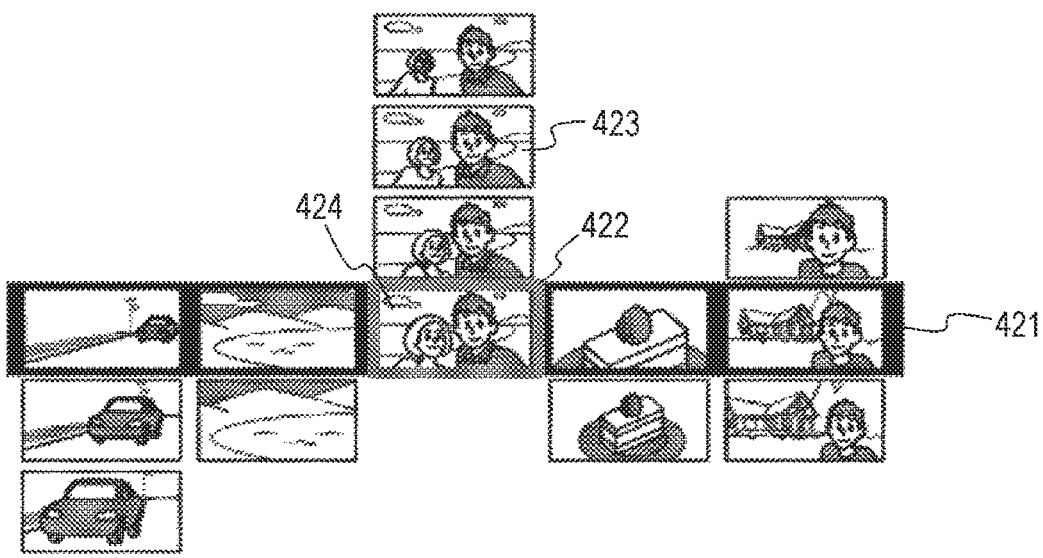

FIGS. 4A and 4B show examples of various screens displayed on the display 105 as a result of the processing of this embodiment in a case where a smartphone such as that of FIG. 2 is used as the electronic device 100. The screen on FIG. 4A is an image capture standby screen displayed on the display 105 when moving image capture is performed. For example, the image capture standby screen of FIG. 4A is an initial screen displayed on the display 105 immediately after an image capture application is activated. FIG. 4B is a screen on which to perform timeline display of a plurality of captured moving images and an editing screen that is displayed on the display 105 when performing timeline editing on the plurality of moving images. For example, the editing screen of FIG. 4B is displayed on the display 105 immediately after moving image capture is complete. Furthermore, the screen displayed on the display 105 switches to the editing screen of FIG. 4B in response to a user operation for starting timeline editing even when moving image capture is not performed. FIGS. 4C and 4D are enlarged views of timeline displays generated on the editing screen of FIG. 4B. Details of the respective screens and so on will be described below.

Figure 5:
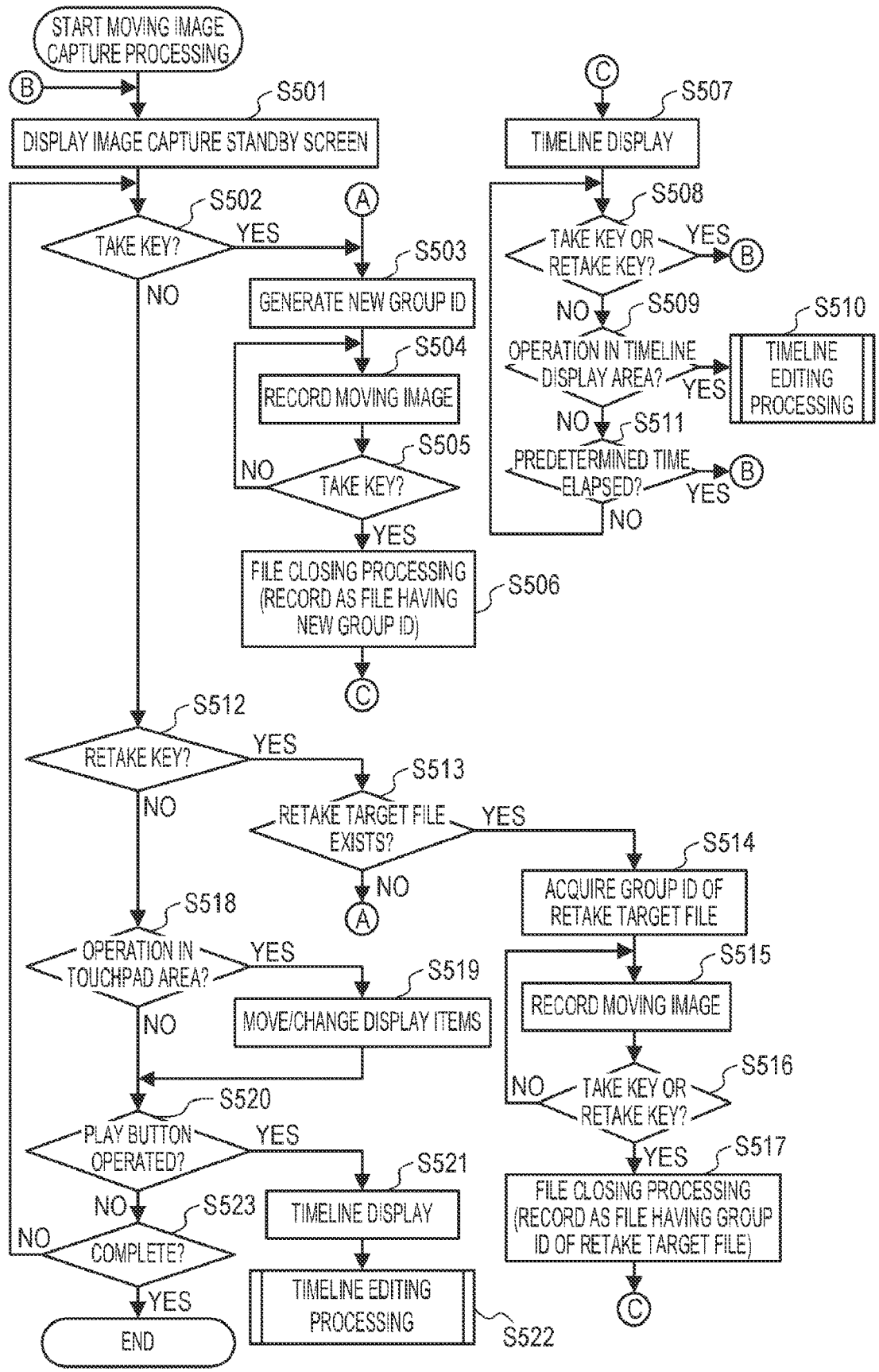
FIG. 5 is a flowchart of moving image capturing processing.

FIG. 5 is a flowchart showing an example of moving image capturing processing performed by the electronic device 100. This processing is realized by the CPU 101 by expanding a program recorded in the nonvolatile memory 103 in the memory 102 and executing the program. When the electronic device 100 is activated and an image capture application corresponding to this embodiment is activated, the processing of FIG. 5 begins. Note that in a case where a digital camera such as that of FIG. 3 is used as the electronic device 100, the processing of FIG. 5 begins when a moving image capture mode is set or the electronic device 100 is activated in the moving image capture mode. The moving image capture mode may be, but does not have to be, set automatically when the electronic device 100 (the digital camera) is activated. The previous operating mode may be set automatically when the electronic device 100 is activated.

In S501, the CPU 101 starts live view image capture using the camera unit 112 and displays the image capture standby screen of FIG. 4A on the display 105. On the image capture standby screen of FIG. 4A, the LV display area 401 is an area in which live view display (LV display) is performed. The touchpad area 402 is an area in which to manipulate a display item (a focus frame 403 or the like, for example) superimposed on the LV display area 401 without directly touching the LV display area 401. The take key 404, the retake key 405, the menu button 406, and a play button 407 are displayed on the image capture standby screen of FIG. 4A.

The take key 404 is a touch button that is operated in order to start a first image capture operation (a take) of a single scene or the like. Hence, in this embodiment, when moving image capture (recording) is started in response to the receipt of a touch operation on the take key 404, the moving image is captured as a moving image of a new group that differs from that of the moving image captured immediately prior thereto. Thus, a plurality of moving images belonging to different groups can be recognized as a plurality of moving images of different scenes. The retake key 405, meanwhile, is a touch button that is operated in order to start recapturing a moving image (a retake) or the like. The retake is highly likely to involve recapturing a moving image of the same scene as the moving image captured immediately prior thereto. In this embodiment, therefore, when moving image capture is started in response to the receipt of a touch operation on the retake key 405, the moving image is captured as a moving image of the same group as the moving image captured immediately prior thereto. Thus, a plurality of moving images belonging to the same group can be recognized as a plurality of moving images of the same scene. Moreover, by using the take key 404 and the retake key 405, the user can perform operations to quickly switch between a take and a retake. The menu button 406 and the play button 407 will be described below.

In S502, the CPU 101 determines whether or not the take key 404 has been operated (touched). When it is determined that the take key 404 has been operated, the processing advances to S503, and when the take key 404 has not been operated, the processing advances to S512.

In S503, the CPU 101 generates a new group ID. The group ID is identification information indicating the corresponding group. In S504, the CPU 101 captures (records) a moving image using the camera unit 112, generates a new moving image file, and records the new moving image file in the recording medium 108 as a moving image file (recording control). The new group ID generated in S503 is recorded in the generated moving image file as attribute information. More specifically, for example, the group ID is set as a part of the file name of the moving image file or recorded in metadata of the moving image file. In S505, the CPU 101 determines whether or not the take key 404 has been operated again. When it is determined that the take key 404 has been operated again, the processing advances to S506, and when the take key 404 has not been operated again, the processing advances to S504, where moving image capture is continued. In S506, the CPU 101 stops recording the moving image file and performs closing processing in relation to the moving image file to which the group ID generated in S503 is attached. As a result, a moving image lasting from the point at which the take key 404 was operated in S502 to the point at which the take key 404 was operated again in S505 is recorded in the recording medium 108 as a single moving image file (data file). Further, a playlist recorded in the nonvolatile memory 103 is updated so that the identification information of the recorded moving image is recorded as the moving image at the tail end of the playback order of the playlist. Note that when a playlist does not exist, a new playlist is generated and the identification information is recorded as the first moving image of the playback order.

Note that in this embodiment, the group ID is attached as the attribute information of the moving image file and the group of moving images is managed using the group ID, but the method for managing a group of moving images is not limited thereto. For example, management information (a table or the like) that indicates a correspondence relationship between the moving image (the file name, a file ID, or the like) and the group (a group name, the group ID, or the like) and is independent of the moving image may be recorded/updated, and the group of moving images may be managed using this management information. Further, moving images may be recorded in a separate folder for each group, and the group of moving images may be managed using the folder in which the moving images are recorded. The CPU 101 may perform only one of a plurality of types of control for implementing the plurality of management methods described above, or may perform two or more of the plurality of types of control.

In S507, the CPU 101 switches the display screen on the display 105 to the editing screen of FIG. 4B in order to perform timeline display on the display 105. On the editing screen of FIG. 4B, the timeline display area 420 is the area in which timeline display is performed. In S507, timeline display shown in FIG. 4C, for example, is performed in the timeline display area 420. By performing timeline display automatically after capturing (recording) a moving image, the user can check the moving images captured up to that point, issue instructions to capture moving images for all of the scenes without forgetting any, and easily perform planning (plan making) relating to moving image capture. Note that when moving image capture is to be performed again, the display screen of the display 105 is switched to the image capture standby screen without performing timeline display (i.e., by performing LV display) so that the user can easily check the object on the display 105.

As shown in FIG. 4C, during timeline display, a plurality of image sequences (sequences 431-435) corresponding respectively to a plurality of groups are displayed side by side along a single axis (referred to hereafter as the "time axis"; in this embodiment, a horizontal axis) using a timeline (a main line) 421. The CPU 101 displays selected images, each representing one moving image included in the group corresponding to each sequence, in a plurality of sections on the timeline 421. The CPU 101 also displays unselected images representing moving images other than the moving image of the selected image, among the plurality of moving images, in the form of columns along a perpendicular axis (referred to hereafter as the "take axis"; in this embodiment, a vertical axis) to the time axis so as to be associated with the sections (the sections on the timeline 421) in which the selected images of the respective groups are displayed. In this embodiment, thumbnail images of the moving images are displayed as the selected images and unselected images. Furthermore, the CPU 101 displays one of the plurality of thumbnail images in an emphasized fashion using a selection frame 422. The role of the selection frame 422 will be described below. Note that the dotted lines in FIG. 4C are shown for convenience in order to indicate the columns and are not displayed.

Hence, during timeline display according to this embodiment, pluralities of thumbnail images respectively representing pluralities of moving images belonging to different groups and pluralities of thumbnail images respectively representing pluralities of moving images belonging to identical groups are displayed in different display directions. According to this timeline display, the user can easily ascertain the correspondence relationships between the groups (the scenes) and the moving images. As a result, the user can perform timeline editing, such as selecting, moving, switching, adding, and deleting thumbnail images, easily and favorably.

Furthermore, although there are no particular limitations on the arrangement of the plurality of thumbnail images (the selected image and the unselected images) in the same column, in this embodiment, the CPU 101 displays the plurality of thumbnail images of the same column so that the images are arranged in the order in which the corresponding plurality of moving images were recorded. According to this timeline display, the user can easily ascertain correspondence relationships between moving images recorded during takes and moving images recorded during retakes and so on for each scene. Typically, the thumbnail images representing the plurality of moving images in the same group are highly likely to be similar. In other words, it is difficult for the user to distinguish differences between the moving images using only the thumbnail images as clues. By arranging the plurality of thumbnail images of the same column (group) in the order in which the moving images were recorded, the user can ascertain the order in which each moving image was recorded simply by checking the position in which the thumbnail image is arranged. In other words, the user can easily distinguish between the plurality of moving images in the same group.

The description will now return to FIG. 5. In S508, the CPU 101 determines whether or not the take key 404 or the retake key 405 has been operated (touched). When it is determined that the take key 404 or the retake key 405 has been operated, the processing advances to S501, and when the take key 404 or the retake key 405 has not been operated, the processing advances to S509. In S509, the CPU 101 determines whether or not the timeline display area 420 has been operated (touched). When it is determined that the timeline display area 420 has been operated, the processing advances to S510, and when the timeline display area 420 has not been operated, the processing advances to S511. In S510, the CPU 101 performs timeline editing processing. The timeline editing processing will be described below using FIG. 6. In S511, the CPU 101 determines whether or not a predetermined time has elapsed following the start of timeline display in S507. When it is determined that the predetermined time has elapsed, the processing advances to S501, and when the predetermined time has not elapsed, the processing advances to S508. Hence, when a predetermined time elapses without any operations being performed following the start of timeline display, the display screen of the display 105 is switched from the editing screen of FIG. 4B to the image capture standby screen of FIG. 4A.

In S512, the CPU 101 determines whether or not the retake key 405 has been operated. When it is determined that the retake key 405 has been operated, the processing advances to S513, and when the retake key 405 has not been operated, the processing advances to S518.

In S513, the CPU 101 determines whether or not a retake target file exists in the recording medium 108. A retake target file is the moving image file recorded immediately before, for example. A retake target file may be the moving image file recorded during the current moving image capture processing (FIG. 5) or a moving image file recorded during past moving image capture processing. When it is determined that a retake target file exists, the processing advances to S514, and when a retake target file does not exist, the processing advances to S503. Accordingly, when a retake target file does not exist, a moving image of a new group is captured in response to an operation of the retake key 405.

In S514, the CPU 101 acquires the group ID attached to the retake target file. In S515, the CPU 101 captures (records) a moving image using the camera unit 112. In S516, the CPU 101 determines whether or not the take key 404 or the retake key 405 has been operated. When it is determined that the take key 404 or the retake key 405 has been operated, the processing advances to S517, and when the take key 404 or the retake key 405 has not been operated, the processing advances to S515, where moving image capture is continued. In S517, the CPU 101 stops moving image capture and attaches the group ID (the group ID of the retake target file) acquired in S514 to the moving image (file closing processing). Here, by stopping moving image capture, a moving image lasting from the point at which the retake key 405 was operated in S512 to the point at which the take key 404 or the retake key 405 was operated in S516 is generated in the recording medium 108 as a single moving image file (data file). Further, on the playlist recorded in the nonvolatile memory 103, the moving image in the arrangement position of the moving image of the used take in the retake target group is replaced with the identifier of the moving image subjected to closing processing in S517. In other words, the playlist is updated so that the moving image captured last in the same group is set as the used take. The processing then advances to S507, where timeline display is performed.

In S518, the CPU 101 determines whether or not a touch operation has been performed in the touchpad area 402. When it is determined that a touch operation has been performed in the touchpad area 402, the processing advances to S519, and when a touch operation has not been performed in the touchpad area 402, the processing advances to S520.

In S519, the CPU 101 moves, modifies, or otherwise manipulates display items (the focus frame 403 or the like, for example) superimposed on the LV display area 401 in accordance with the touch operation of S518 (the touch operation on the touchpad area 402).

In S520, the CPU 101 determines whether or not the play button 407 has been operated. When it is determined that the play button 407 has been operated, the processing advances to S521, and when the play button 407 has not been operated, the processing advances to S523.

In S521, the CPU 101 switches the display screen of the display 105 to the editing screen of FIG. 4B in order to perform timeline display on the display 105. By starting timeline display in response to an operation of the play button 407, the user can check the timeline display at any desired timing. In S522, the CPU 101 performs timeline editing processing. The timeline editing processing will be described below using FIG. 6.

In S523, the CPU 101 determines whether or not the moving image capture processing is complete. For example, the CPU 101 determines that the moving image capture processing is complete when an operation (depression of the power supply button 106b or the like) for issuing an instruction to switch the power supply of the electronic device 100 OFF or an operation (depression of the home button 106c or the like) for issuing an instruction to terminate the image capture application is performed. When it is determined that the moving image capture processing is complete, the moving image capture processing is terminated, and when the moving image capture processing is not complete, the processing advances to S501.

Figure 6:
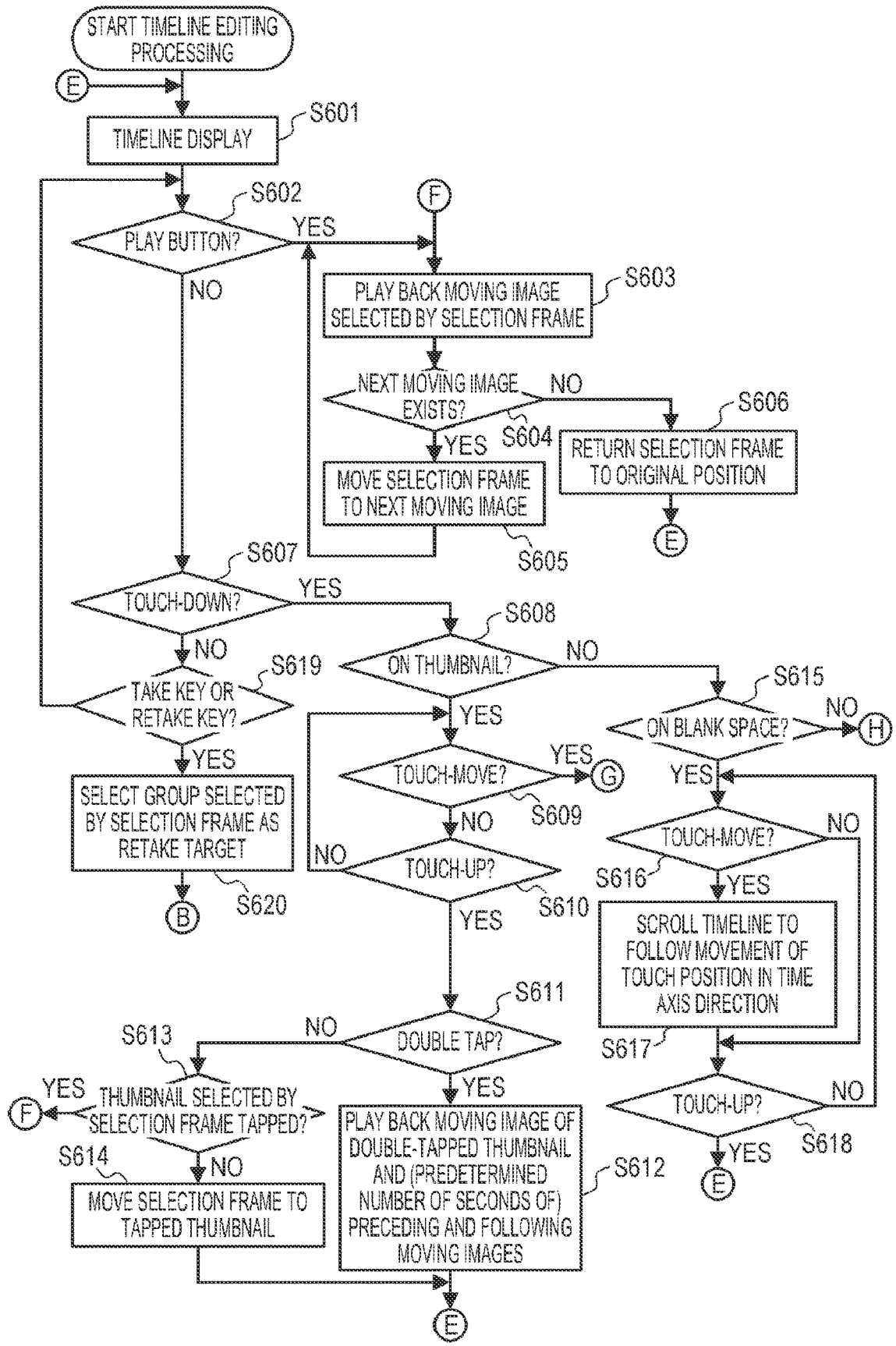
FIG. 6 is a partial flowchart of timeline editing processing.
Figure 7:
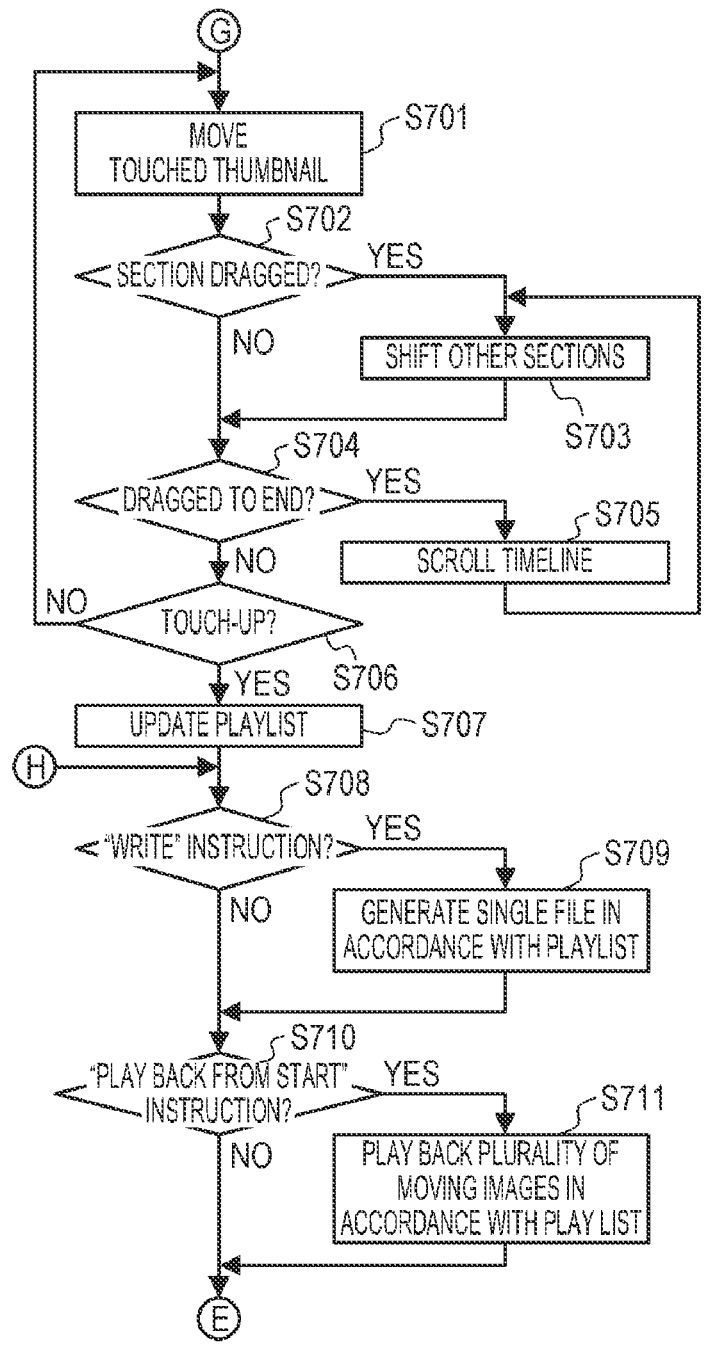
FIG. 7 is a partial flowchart of the timeline editing processing.

FIGS. 6 and 7 are flowcharts showing an example of the timeline editing processing performed by the electronic device 100. This processing is realized by the CPU 101 by expanding a program recorded in the nonvolatile memory 103 in the memory 102 and executing the program. The timeline editing processing is performed in S510 and S522 of FIG. 5. Note that the timeline editing processing may be performed using an editing application that differs from the image capture application that performs the processing of FIG. 5. In this case, the timeline editing processing begins when the electronic device 100 is activated and the editing application is activated. When a digital camera such as that of FIG. 3 is used as the electronic device 100, the processing of FIGS. 6 and 7 begins when an editing mode is set or the electronic device 100 is activated in the editing mode. The editing mode may be, but does not have to be, set automatically when the electronic device 100 (the digital camera) is activated. The previous operating mode may be set automatically when the electronic device 100 is activated.

In S601, the CPU 101 switches the display screen of the display 105 to the editing screen of FIG. 4B in order to perform timeline display on the display 105. Note that when timeline display is already underway, the processing of S601 is omitted. In S602, the CPU 101 determines whether or not the play button 407 has been operated. When it is determined that the play button 407 has been operated, the processing advances to S603, and when the play button 407 has not been operated, the processing advances to S607.

In S603, the CPU 101 plays back the moving image of the thumbnail image selected by the selection frame 422 (FIG. 4C). In this embodiment, a predetermined direction (in FIG. 4C, either a direction heading from left to right or a direction heading from right to left) along the timeline 421 (the time axis) is set as the playback order of the plurality of moving images in the different groups. In S604, the CPU 101 determines whether or not a following selected image (a thumbnail image on the timeline) exists in the playback order. When it is determined that a following selected image exists in the playback order, the processing advances to S605, and when a following selected image does not exist in the playback order, the processing advances to S606. In S605, the CPU 101 moves the selection frame 422 to the position of the following selected image, whereupon the processing returns to S603. In S606, when the selection frame 422 has been moved in S605, the CPU 101 returns the selection frame 422 to its original position (the position of the selected image corresponding to the moving image played back first), whereupon the processing returns to S601. Note that by performing a different operation to operation of the play button 407, the moving image of the thumbnail image selected by the selection frame 422 may be played back alone.

In this embodiment, at the start of timeline display or the like, the CPU 101 reads the playlist indicating the playback order of the plurality of moving images respectively represented by the plurality of selected images from the nonvolatile memory 103. The playlist is constituted by table data or the like in which the file IDs of the plurality of moving images respectively represented by the plurality of selected images are arranged in the playback order. The CPU 101 then performs timeline display so that the columns (groups) are arranged in accordance with the playlist and plays back the plurality of moving images in order. When a moving image of a new group is recorded in a take, for example, the CPU 101 updates the playlist and additionally displays a selected image representing the moving image of the new group in the final position in the playback order. When a moving image of an existing group is recorded in a retake, the CPU 101 additionally displays a thumbnail image of the recorded moving image as the selected image or an unselected image of the column corresponding to the group. When the thumbnail image of the recorded moving image is displayed as the selected image, the playlist is updated.

Here, a case in which a direction heading from left to right along the timeline 421 (the time axis) is set as the playback order in the state shown in FIG. 4C will be considered. In FIG. 4C, a thumbnail image 423 (the selected image) has been selected using the selection frame 422. Therefore, the thumbnail image 423 (the moving image of the thumbnail image 423) is played back first, whereupon the plurality of selected images on the right side of the thumbnail image 423 are selected by the selection frame 422 and played back in order. In FIG. 4C, when playback is started from the moving image represented by the thumbnail image 423, the other moving images in the same column 433 are not played back, and instead, the moving image represented by a thumbnail image 426 displayed on the timeline 421, among the thumbnail images arranged in the next column 434, is played back. When there are no more selected images on the right side of the selected image selected by the selection frame 422, the selection frame 422 returns to the position of the thumbnail image 423. Note that when playback is started in a state where the rightmost selected image has been selected by the selection frame 422, only the moving image of the thumbnail image selected by the selection frame 422 is played back, and the selection frame 422 does not move.

The description will now return to FIG. 6. In S607, the CPU 101 determines whether or not a Touch-Down has been performed on the display 105 (the touch panel 106a). When it is determined that a Touch-Down has been performed, the processing advances to S608, and when a Touch-Down has not been performed, the processing advances to S619.

In S608, the CPU 101 determines whether or not the Touch-Down of S607 was a touch operation performed on one of the thumbnail images. When it is determined that the Touch-Down was a touch operation performed on a thumbnail image, the processing advances to S609, and when the Touch-Down was not a touch operation performed on a thumbnail image, the processing advances to S615.

In S609, the CPU 101 determines whether or not a Touch-Move has been performed on the display 105. When it is determined that a Touch-Move has been performed, the processing advances to S701 of FIG. 7, and when a Touch-Move has not been performed, the processing advances to S610. FIG. 7 will be described below.

In S610, the CPU 101 determines whether or not a Touch-Up has been performed on the display 105. When it is determined that a Touch-Up has been performed, the processing advances to S611, and when a Touch-Up has not been performed, the processing advances to S609. It is determined in S610 that a Touch-Up has been performed when the touch is released without performing a Touch-Move following the Touch-Down.

In S611, the CPU 101 determines whether or not a double tap has been performed on the display 105 (a thumbnail image). A touch operation in which the finger or pen touching the display 105 (the touch panel 106a) is released from the display 105 within a predetermined time following the start of the touch without being moved is a tap, and a touch operation in which a tap is performed twice within a brief time interval is a double tap. When it is determined that a double tap has been performed, the processing advances to S612, and when a double tap has not been performed, the processing advances to S613. Note that since a Touch-Down is performed in S607 and a Touch-Up is performed in S610, it may be said that a tap has been performed at least once at the point of S611.

In S612, the CPU 101 plays back, in the playback order, the moving image of the thumbnail image on which the double tap was performed, a predetermined number of seconds (5 seconds, for example) at the end of the moving image of the preceding selected image in the playback order, and a predetermined number of seconds at the start of the next selected image in the playback order, whereupon the processing returns to S601. Here, a case in which a direction heading from left to right along the timeline 421 (the time axis) is set as the playback order and a double tap has been performed on a thumbnail image 424 (an unselected image) in the state shown in FIG. 4C will be considered. In this case, first, the predetermined number of seconds at the end of the moving image of a thumbnail image 425 on the timeline 421 in the column 432 one to the left of the thumbnail image 424 is played back. Next, the entire length of the moving image of the thumbnail image 424 is played back. Finally, the predetermined number of seconds at the start of the moving image of a thumbnail image 426 on the timeline 421 in the column 434 one to the right of the thumbnail image 424 is played back. Thus, when the user changes the selected image of the column 433 to the thumbnail image 424 (an unselected image), which is not currently on the timeline 421, the user can check how the preceding and following moving images connect thereto and determine whether the connection is favorable. In other words, the user can be assisted in determining whether or not to change the selected image to the thumbnail image 424.

In S613, the CPU 101 determines whether or not the Touch-Up determined in S610 was a tap on the thumbnail image selected by the selection frame 422. When it is determined that a tap has been performed on the thumbnail image selected by the selection frame 422, the processing advances to S603, and when a tap has not been performed on the thumbnail image selected by the selection frame 422, the processing advances to S614.

In S614, the CPU 101 moves the selection frame 422 to the position of the tapped thumbnail image, whereupon the processing returns to S601.

When the Touch-Down of S607 was not a touch operation performed on a thumbnail image, the CPU 101 determines in S615 whether or not the Touch-Down of S607 was a touch operation performed in a blank space in the timeline display area 420. A blank space is an area of the timeline display area 420 in which no thumbnail image is displayed. When it is determined that the Touch-Down was a touch operation performed in a blank space, the processing advances to S616, and when the Touch-Down was not a touch operation performed in a blank space, the processing advances to S708 of FIG. 7. FIG. 7 will be described below.

In S616, the CPU 101 determines whether or not a Touch-Move has been performed on the display 105. When it is determined that a Touch-Move has been performed, the processing advances to S617, and when a Touch-Move has not been performed, the processing advances to S618.

In S617, the CPU 101 scrolls the plurality of thumbnail images (the timeline) either rightward or leftward along the time axis so as to follow the movement of the touch position in the direction of the time axis (a left-right direction). As a result, a non-displayed column can be displayed. Note that a scroll bar for moving the time axis horizontally may be displayed separately, and the processing of S617 may be performed in response to an operation for touching and then performing a Touch-Move on the scroll bar.

In S618, the CPU 101 determines whether or not a Touch-Up has been performed on the display 105. When it is determined that a Touch-Up has been performed, the processing advances to S601, and when a Touch-Up has not been performed, the processing advances to S616.

When a Touch-Down was not performed in S607, the CPU 101 determines in S619 whether or not the take key 404 or the retake key 405 has been operated. When it is determined that the take key 404 or the retake key 405 has been operated, the processing advances to S620, and when the take key 404 or the retake key 405 has not been operated, the processing advances to S602.

In S620, the CPU 101 selects the group including the moving image of the thumbnail image selected by the selection frame 422 as a retake target, whereupon the processing advances to S501 of FIG. 5 (i.e., returns to the moving image capture processing of FIG. 5). Accordingly, a moving image of the same group as the moving image of the thumbnail image selected by the selection frame 422 is captured in response to an operation of the retake key 405. Thus, the user can issue an instruction to retake a moving image of a desired group by issuing an instruction to move the selection frame 422. Note that during timeline display following image capture, the thumbnail image of the moving image captured last is selected by the selection frame 422. If the selection frame 422 is not moved, therefore, a moving image of the same group as the moving image captured immediately before is captured in response to an operation of the retake key 405. For example, when the retake key 405 is operated in a case where the selection frame 422 is displayed on a thumbnail image in the column 433, as shown in FIG. 4C, the group of the column 433 is selected as the retake target, whereupon the processing advances to S501 of FIG. 5 (the moving image capture processing). Then, when the retake key 405 is operated during the moving image capture processing, capture/recording of a moving image belonging to the group of the column 433 is started. As a result, when the timeline is displayed again thereafter, a thumbnail image is newly added to the tail end (the bottom) of the thumbnail images arranged in the column 433. Further, when the take key 404 is operated during moving image capture processing in which the group of the column 433 is set as the retake target, a new group is generated, and the moving image is captured as a moving image of the new group. The new group is added as either the group at the tail end of the timeline display or the group following the group of the selected retake target. In the example of FIG. 4C, when a group is added to the tail end, a new column is displayed to the right of the column 435, and a thumbnail image of the captured moving image is displayed. Alternatively, when a group following the group of the selected retake target is added, the new group is inserted between the column 433 and the column 434, and a thumbnail image of the captured moving image is displayed.

FIG. 7 will now be described. In S701, the CPU 101 moves the thumbnail column belonging to the group of the touched thumbnail image in accordance with the Touch-Move performed in S609 of FIG. 6.

For example, when the thumbnail image 423 of FIG. 4C is touched and the touch position is moved in an upward direction along the take axis, all of the thumbnail images (the selected image and the unselected images) in the column 433 in which the thumbnail image 423 is displayed move in an upward direction along the take axis. Thus, the moving image displayed as the selected image of the column 433 can be changed. For example, the state of the timeline display can be switched from the state shown in FIG. 4C to a state shown in FIG. 4D so that the thumbnail image 423 becomes an unselected image and the thumbnail image 424 becomes the selected image. Note that as long as it is possible to select the moving image to be displayed as the selected image in the column only from the plurality of moving images in the group corresponding to the column, there are no particular limitations on the selection method. With the method described above, the order in which the thumbnail images are arranged in the column can be maintained.

Further, when the touch position is moved along the time axis, all of the thumbnail images in the column of the touched thumbnail image, or in other words the same column as that of the touched thumbnail image, move (are dragged) along the time axis.

In S702, the CPU 101 determines whether or not a column has been dragged along the time axis. When it is determined that a column has been dragged along the time axis, the processing advances to S703, and when a column has not been dragged along the time axis, the processing advances to S704.

Figure 4E:
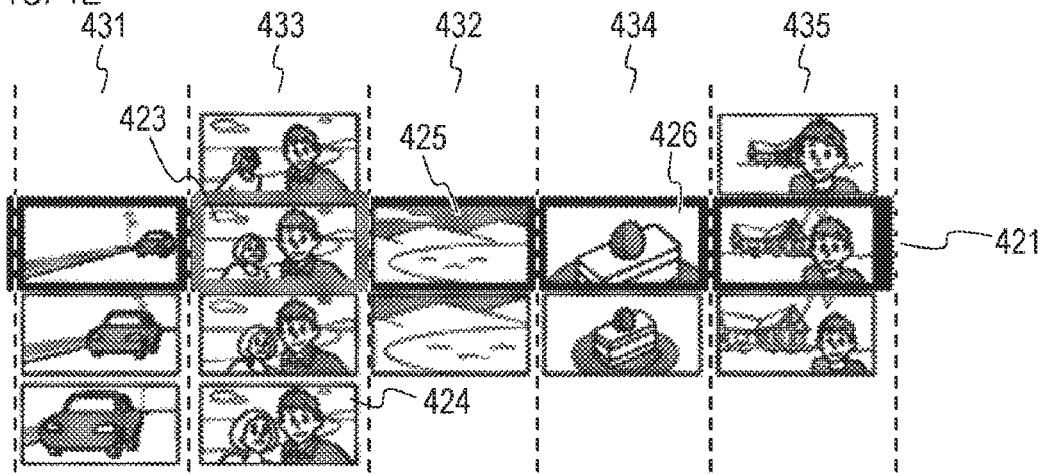

In S703, the CPU 101 shifts the other columns along the time axis so that the dragged column is inserted into the position to which the column has been dragged. More specifically, control for shifting all of the columns on the left side (the front side in the playback order) of the position to which the column has been dragged to the left side and/or control for shifting all of the columns on the right side (the rear side in the playback order) of the position to which the column has been dragged to the right side is performed. In so doing, the plurality of columns can be rearranged. In other words, the playback order of the moving images can be changed while maintaining the groups. As a result, it is possible for the user to change only the moving image displayed as the selected image to another moving image in the same group even after the playback order is changed. The playback order can of course also be changed after changing the moving image displayed as the selected image. Hence, in this embodiment, there is a high degree of freedom in the order in which the moving image displayed as the selected image is changed and the playback order is changed, leading to superior operability. For example, when the thumbnail image 423 of FIG. 4C is touched and the touch position is dragged one interval forward (one interval leftward) along the time axis, a state shown in FIG. 4E is realized.

In S704, the CPU 101 determines whether or not a column has been dragged to the end portion of the timeline display area 420 in the time axis direction (a left-right direction). When it is determined that a column has been dragged to the end portion, the processing advances to S705, and when a column has not been dragged to the end portion, the processing advances to S706.

In S705, the CPU 101 scrolls the plurality of thumbnail images rightward or leftward along the time axis successively as the amount of time that the drag position is positioned at the end portion increases so that invisible parts of the timeline on the side of the drag position are newly displayed (so that the timeline moves in the opposite direction to the end portion side of the drag position).

In S706, the CPU 101 determines whether or not a Touch-Up has been performed on the display 105. When it is determined that a Touch-Up has been performed, the processing advances to S707, and when a Touch-Up has not been performed, the processing advances to S701.

In S707, the CPU 101 updates the playlist in accordance with the order in which the plurality of selected images are arranged. For example, when a dragging operation along the time axis is started in the state of FIG. 4C and a Touch-Up is performed in the state of FIG. 4E, the order (the playback order) in which the moving images are arranged on the playlist is updated to the state shown in FIG. 4E. More specifically, to describe the order using the thumbnail images corresponding to the moving images, the state in FIG. 4C, in which the thumbnail images 425, 423, 426 are arranged in that order, is updated to the state shown in FIG. 4E, in which the thumbnail images 423, 425, 426 are arranged in that order.

In S708, the CPU 101 determines whether or not a "write" instruction has been issued by operating the menu button 406 or the like. When it is determined that a "write" instruction has been issued, the processing advances to S709, and when a "write" instruction has not been issued, the processing advances to S710. In S709, the CPU 101 generates a single moving image file connecting the plurality of moving images (moving image files) respectively represented by the plurality of selected images in an order corresponding to the playlist (the order in which the plurality of selected images are arranged) from the plurality of moving images, and records the result in the recording medium 108 as a moving image file of edited moving images. As a result, playback can be performed from a single moving image file in a similar manner to when the plurality of moving images corresponding respectively to the plurality of selected images are played back in order but without using the playlist.

In S710, the CPU 101 determines whether or not a "play back from start" instruction has been issued by operating the menu button 406 or the like. When it is determined that a "play back from start" instruction has been issued, the processing advances to S711, and when a "play back from start" instruction has not been issued, the processing advances to S601 of FIG. 6. In S711, the CPU 101 plays back the plurality of moving images (the moving image files) respectively represented by the plurality of selected images in an order corresponding to the playlist (the order in which the plurality of selected images are arranged).

Note that when the processing advances from S615 in FIG. 6 to S708 in FIG. 7, the user performs a single Touch-Up and then issues an instruction such as "write" or "play back from start" by operating the menu button 406 or the like. It is assumed that in addition to the processing described above, an image in a specific column can also be deleted from the timeline display (either the file can be deleted from the recording medium 108 or the file can be deleted from the playlist while still being held).

According to this embodiment, as described above, by using the take key 404 and the retake key 405 appropriately, a moving image of a new group can be captured and a moving image of an existing group can be captured. Further, simply by operating the take key 404 and the retake key 405, both moving image capture and allocation of a group to the captured moving image can be performed simultaneously without performing any other operations. Hence, there is no need for the user to determine the group to which to allocate the moving image following image capture, and as a result, moving image capture can be performed efficiently (the user-friendliness of the electronic device 100 is improved). More specifically, when recapture (a retake) is determined to be necessary midway through moving image capture, the retake can be performed quickly simply by temporarily stopping moving image recording and operating the retake key 405, without the need for complicated operations. Moreover, even when the number of moving images captured in retakes becomes large, the moving images are managed as moving images of the same group, and therefore, even when a large number of moving image files are recorded, it is easy to determine subsequently the moving image files that were acquired as retakes of the same scene, with the result that an editing operation can be performed without confusion. Furthermore, even when a retake is performed, the moving image captured prior thereto is held in the same group without being overwritten or deleted, and therefore, when it is subsequently determined that the moving image prior to the retake was better after all, an edit using the moving image prior to the retake can be created.

Further, according to this embodiment, only the thumbnail image (the selected image) representing one of the moving images included in one group is displayed in each section of the timeline 421. Therefore, when a plurality of moving images are played back in order, it is possible to play back only a plurality of moving images in different groups rather than playing back a plurality of moving images in the same group. Further, the thumbnail images (the unselected images) representing the moving images other than the moving image of the selected image, among the plurality of moving images, are displayed in the same column in association with the section in which the selected image is displayed. Therefore, the user can easily ascertain the correspondence relationships between the groups and the moving images. As a result, the user can easily perform timeline editing such as selecting, moving, switching, adding, and deleting the thumbnail images so that a plurality of desired moving images are played back in the desired order. Similar effects are acquired likewise in a case where a single moving image file constituted by a plurality of moving images is generated.

Note that an example using moving images as content was described above, but the content is not limited to moving images. Sound, static images, and so on, for example, may also be used as content. In the example of sound, as a result of the processing of this embodiment, sounds can be managed in units of songs, phrases, or bars, and timeline editing for playing back a plurality of desired songs in a desired order can be performed easily. In the example of static images, effects such as facilitating timeline editing for performing a slideshow in which a plurality of desired static images are displayed while being switched in a desired order are realized.

Note that an example in which the take key 404 and the retake key 405 are enabled at all times in the image capture standby state was described above, but the take key 404 and the retake key 405 may be switched between enabled and disabled states. For example, the CPU 101 may enable the retake key 405 when a predetermined recording mode for recording moving images is set and disable (display in a grayed-out form or not display) the retake key 405 when the predetermined recording mode is not set. The predetermined recording mode is a self-photography mode in which the photographer records a moving image of him/herself or the like. When the content is sound, the predetermined recording mode is a mode for recording the voice of the operator of the electronic device 100 or the like.

The CPU 101 disables the retake key 405 when, for example, an out-camera for capturing the opposite side to the photographer side as seen from the electronic device 100 (the opposite side to the display surface of the display 105) is activated. The CPU 101 then displays the retake key 405 in an enabled state when the camera used for image capture is switched from the out-camera to an in-camera (camera unit 112). Further, when the camera used for image capture is switched from the in-camera to the out-camera, the CPU 101 disables the retake key 405. When the camera unit 112 is provided in a vari-angle unit that enables modification of the image capture direction and the camera unit 112 is oriented toward the photographer side (when a direction oriented toward the photographer is the image capture direction), the CPU 101 displays the retake key 405 in an enabled state. When the camera unit 112 is oriented toward the opposite side to the photographer side (when a direction oriented away from the photographer is the image capture direction), on the other hand, the CPU 101 disables the retake key 405.

Self-photography is often performed by users who publish originally created moving image content or the like on the Internet, such as users who in recent years post large numbers of moving images on moving image sharing websites. In self-photography, if the user is dissatisfied with a captured moving image, he/she can perform self-photography as many times as he/she wishes, and therefore self-photography is more likely to be performed repeatedly than image capture in which another person is used as the object. Hence, the function of this embodiment of "capturing a moving image of the same group as that of the moving image captured immediately prior thereto in response to depression of the retake key 405" may be said to be particularly useful in self-photography. Further, by disabling the retake key 405 during image capture other than self-photography, complexity and troublesomeness can be prevented in the operations of the apparatus as a whole. Furthermore, the possibility that during image capture in which another person is used as the object, more time than necessary will be required of the other person to complete image capture due to repeated retakes can be reduced.

Note that an example in which the retake key 405 is displayed on the image capture standby screen of FIG. 4A as an enabled touch key from the start was described above, but this does not have to be the case. At first (immediately after the moving image capture processing of FIG. 5 starts; immediately after the moving image capture mode is set), the retake key 405 may be disabled and the take key 404 may be displayed in an enabled state. Then, immediately after a moving image file of a new group has been created through the file closing processing of S506 (immediately after recording of a moving image of a new group is stopped), the retake key 405 may be displayed in an enabled state (grayed-out display or non-display may be canceled). Typically, the image capture that is performed immediately after activation of the image capture application is often a so-called first take, or in other words a first image capture operation rather than a recapture operation. Therefore, by disabling the retake key 405, user confusion about the operation method and erroneous operations can be suppressed. Furthermore, the retake key 405 may be displayed in an enabled state and the take key 404 may be disabled up to the point at which a predetermined time (10 seconds, for example) elapses after recording of the moving image is stopped. Then, immediately after the predetermined time elapses, either the take key 404 and the retake key 405 may both be displayed in an enabled state, or the take key 404 may be displayed in an enabled state and the retake key 405 may be disabled. When the next moving image capture operation is started immediately after moving image capture, the next moving image capture operation is often a retake of an immediately preceding failed image capture operation rather than image capture of a new scene. Therefore, by disabling the take key 404 immediate after a moving image capture operation, user confusion about the operation method and erroneous operations can be suppressed. By switching between these enabled/disabled states, moving image capture can be advanced even more efficiently. Note that it is also possible to switch between these enabled/disabled states during self-photography.

Immediately after a moving image is played back, the CPU 101 may capture a moving image of the same group as the played back moving image in response to an operation of the retake key 405. More specifically, when a moving image is played back, the CPU 101 may set the moving image file of the played-back moving image as a retake target file. Typically, an image capture operation performed by operating the retake key 405 immediately after a moving image is played back is often performed to recapture the played-back moving image. Hence, by capturing a moving image of the same group as the played-back moving image, group-forming (grouping) of the moving images can be performed more favorably.

The CPU 101 may change the current type of image capture (take/retake) in response to an operation of the take key 404 or the retake key 405 during moving image capture (during recording). For example, when the take key 404 is operated while recording a moving image of the same group as the moving image recorded immediately prior thereto (i.e., during a retake), the CPU 101 performs modified control so that the moving image being recorded is recorded as a moving image of a new group (i.e., a moving image of a take). In other words, the group ID recorded as the attribute information of the moving image file being recorded is overwritten from the group ID of the retake target to a new group ID. Meanwhile, when the retake key 405 is operated while recording a moving image of a new group (i.e., during a take), the CPU 101 performs modified control so that the moving image being recorded is recorded as a moving image of the same group as the moving image recorded immediately prior thereto (i.e., a moving image of a retake). In other words, the new group ID recorded as the attribute information of the moving image file being recorded is overwritten by the group ID of the retake target. In a configuration where this control is not performed, when a user who wishes to perform a take issues an image capture instruction using the retake key 405, a retake is performed against the intentions of the user, and when a user who wishes to perform a retake issues an image capture instruction using the take key 404, a take is performed against the intentions of the user. By employing the control configuration described above, however, the user can modify the current type of image capture to the desired type of image capture by operating the take key 404 or the retake key 405 during image capture. Moreover, by aligning the type of the touch key with the modified type of image capture, operations can be made easier to understand.

The CPU 101 may stop moving image capture in response to an operation of either the take key 404 or the retake key 405 during moving image capture. By making it possible to issue an instruction to stop moving image capture using either the take key 404 or the retake key 405, user confusion about the operation method can be suppressed, and the user can more easily stop moving image capture at a desired timing.

Furthermore, the CPU 101 may align the touch key used to stop moving image capture with the type of moving image capture. More specifically, while capturing a moving image of the same group as the moving image captured immediately prior thereto, or in other words during a retake, moving image capture is stopped in response to an operation of the retake key 405 but not stopped in response to an operation of the take key 404. Further, w % bile capturing a moving image of a new group, or in other words during a take, moving image capture is stopped in response to an operation of the take key 404 but not stopped in response to an operation of the retake key 405. By aligning the touch key used to stop moving image capture with the type of moving image capture, operational consistency can be improved and erroneous operations can be reduced.

The CPU 101 may delete the moving image currently being recorded when the take key 404 is operated during a retake and when the retake key 405 is operated during a take. With this configuration, when the user notices an image capture mistake during image capture, for example, the user operates the take key 404 or the retake key 405 to delete (not record) the moving image in which the image capture mistake was made. As a result, a moving image in which an image capture mistake was made can be deleted quickly, and recording of unnecessary moving images can be avoided. Furthermore, the CPU 101 may attach predetermined metadata to the moving image being recorded when the take key 404 is operated during a retake and when the retake key 405 is operated during a take. In this case, the CPU 101 may display a predetermined display item on the timeline display in association with the thumbnail image of the moving image to which the predetermined metadata are attached. Thus, the user can easily distinguish between a moving image in which an image capture mistake was made and other moving images, and as a result, timeline editing can be performed more easily.

The CPU 101 may display a display indicating the number of moving images in the same group as the moving image recorded immediately before on the display 105 when a retake is started (display control). The "number of moving images in the same group as the moving image recorded immediately before" may be a number including the moving image recorded during the current retake or a number not including that moving image. For example, the CPU 101 displays the number of moving images recorded in takes, the number of the take for which the current retake is being performed, or the like. Thus, the user can easily determine whether a sufficient number of image capture operations have been performed for one scene and so on, and as a result, an improvement in user-friendliness is achieved.

The CPU 101 may attach a rating (a degree of importance) to a captured moving image in response to an operation in the touchpad area 402 (an operating unit for changing the AF position) after moving image capture is stopped. In this case, the CPU 101 may display a display item corresponding to the rating on the timeline display in association with the thumbnail image. Thus, the user can easily distinguish between moving images of high importance and moving images of low importance, and as a result, timeline editing can be performed more easily.

The CPU 101 may notify the user of whether a take or a retake is underway (notification control). Either a display item enabling recognition of whether a take or a retake is underway may be displayed on the display 105, or notification of whether a take or a retake is underway may be provided by another method (the illumination color of a lamp, lamp illumination/flashing, sound output, and so on). Thus, the user can easily ascertain the current type of image capture. As a result, when image capture of the wrong type is underway, for example, the user can immediately realize the error in the type of image capture, interrupt the current image capture operation, and quickly start an operation for performing the desired type of image capture.

Figure 8A:
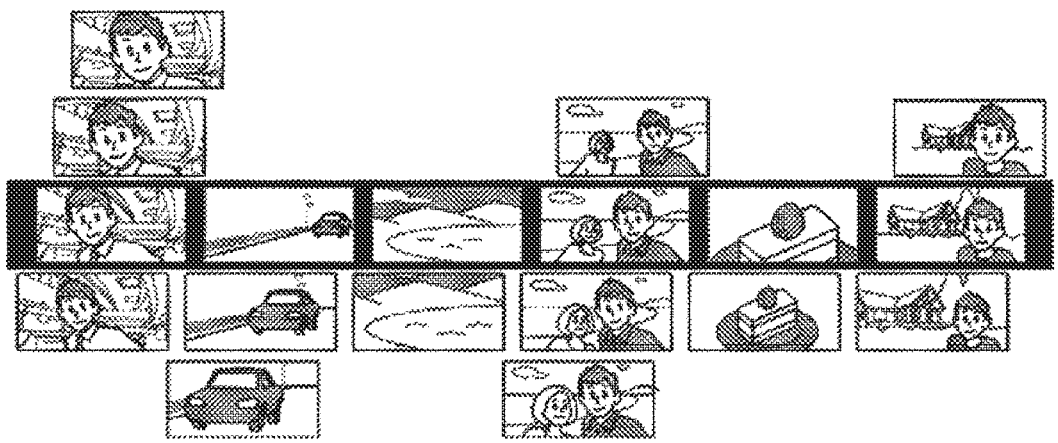
FIGS. 8A and 8B show examples of timeline display.
Figure 8B:
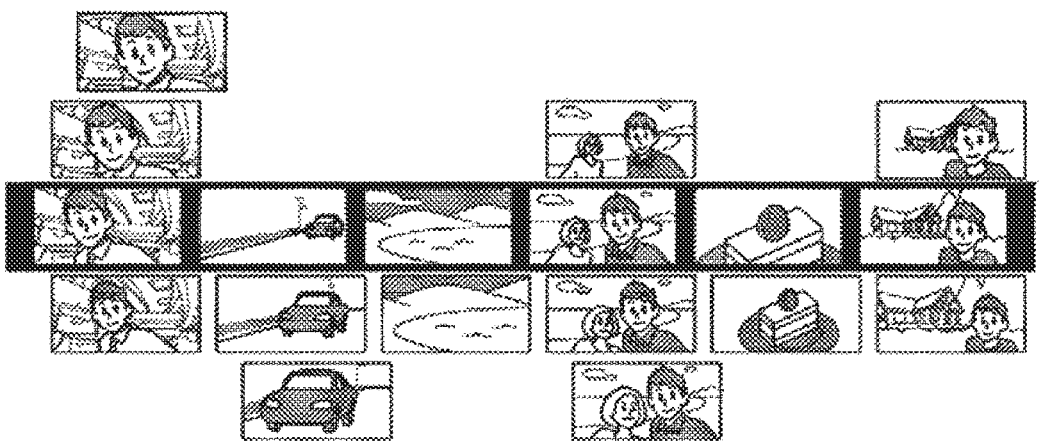

As long as the unselected images are displayed in association with each section of the timeline 421, there are no particular limitations on the display method of the unselected images. For example, the screen displaying the unselected images may be different from the screen displaying the selected images. Note, however, that in consideration of the ease of viewing the timeline display, the unselected images and the selected images are preferably displayed on the same screen, as shown in FIG. 4B. Further, as long as the take axis is different to the time axis, the take axis does not have to be perpendicular to the time axis. For example, the take axis may be a rectilinear axis that is diagonal to the time axis or an arc-shaped axis. FIG. 8A shows an example in which the take axis is a rectilinear axis that is diagonal to the time axis, and FIG. 8B shows an example in which the take axis is an arc-shaped axis. Likewise in FIGS. 8A and 8B, similarly to FIG. 4C, the take axis can be differentiated from the time axis. Hence, the user can easily distinguish the selected images from the unselected images and differentiate clearly between an operation for changing the moving image displayed as the selected image and an operation for changing the playback order of the moving images.

Figure 9A:
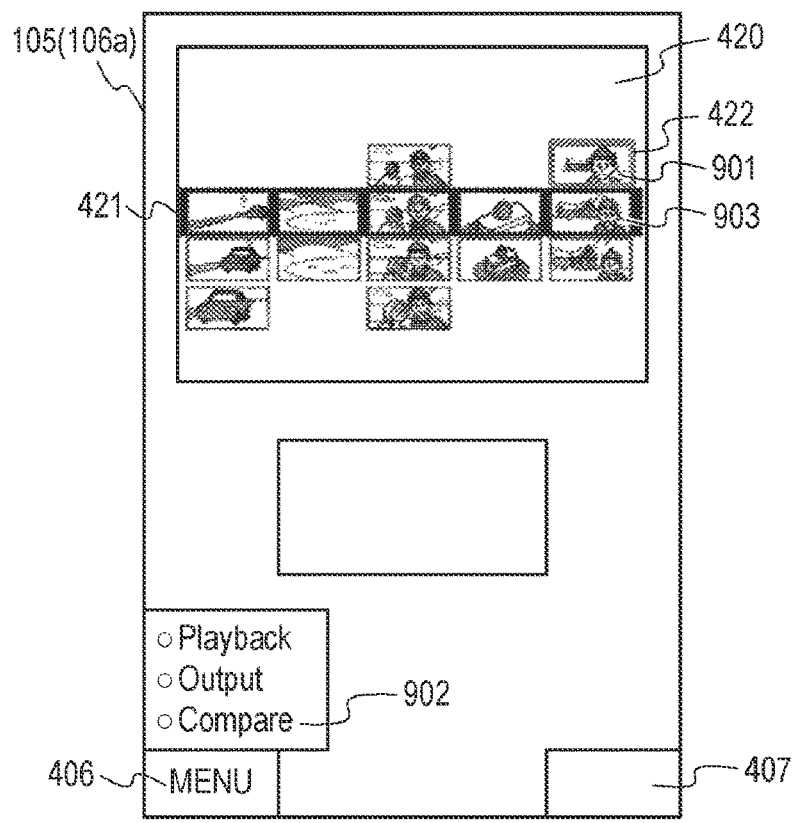
FIG. 9A shows an example of the editing screen.
Figure 9B:
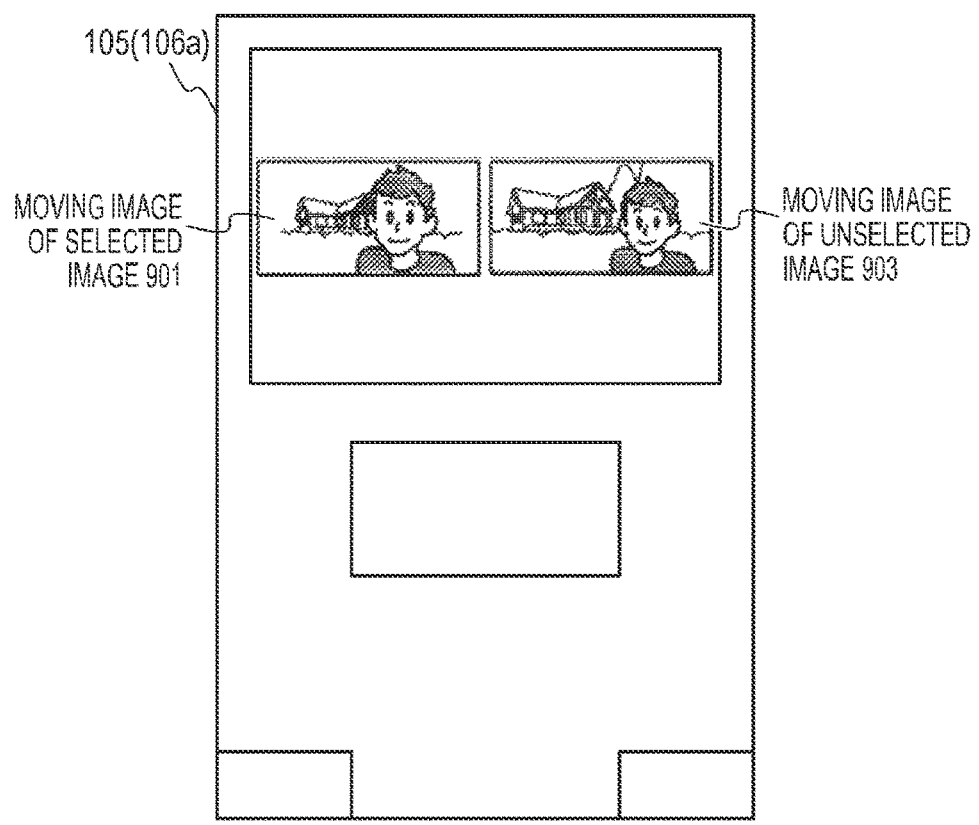
FIG. 9B shows an example of a comparative playback screen.

The CPU 101 may play back the moving image represented by the selected image of a section and the moving images represented by the unselected images (the images in the same column) of the group corresponding to the section so that the user can compare the moving images. For example, when an unselected image 901 is selected by the selection frame 422, as on the editing screen shown in FIG. 9A, the CPU 101 may display a "Compare" option (item) 902 either automatically or in response to a user operation. Then, when the user selects (specifies) the option 902, the CPU 101 may switch the display screen to a comparative playback screen shown in FIG. 9B and play back the moving image of the unselected image 901 and the moving image of a selected image 903 in the section of the timeline that is in the same column as the unselected image 901 so that the respective moving images are displayed side by side. In other words, the two moving images may be played back in two adjacent areas of the same screen. Playback of the two moving images may be started at the same timing or not at the same timing. The two moving images are moving images in the same group, captured in different image capture operations of the same scene. With this configuration, therefore, the user can easily select a more favorable moving image for each scene.

When a "Playback" option is selected, the moving image of the unselected image 901 selected by the selection frame 422 is played back. Thereafter, the moving image following the played-back moving image (i.e., the moving image of the selected image) may be, but does not have to be, played back in order. When an "Output" option is selected, the moving image file of the unselected image 901 selected by the selection frame 422 is output to the outside.

Note that during live view display, as shown in FIG. 4C and so on, all of the unselected images of the displayed columns (groups) are displayed, but instead, only some of the unselected images may be displayed. For example, the unselected images of the group (the column) of a selected image specified in response to a user operation, such as a selected image selected by the selection frame 422, a touched selected image, or the like may be displayed while not displaying the unselected images of the other groups (the other columns).

Note that the various types of control described above as being performed by the CPU 101 may be performed by a single piece of hardware, or overall control of the apparatus may be performed by apportioning the processing to a plurality of pieces of hardware (a plurality of processors or circuits, for example).

Further, the present invention was described in detail above on the basis of preferred embodiments thereof, but the present invention is not limited to these specific embodiments and includes various aspects within a scope that does not depart from the spirit of the invention. Moreover, each of the embodiments described above merely illustrates a single embodiment of the present invention, and the embodiments may be combined as appropriate.

Furthermore, in the above embodiments, cases in which the present invention is applied to a smartphone or a digital camera were described as examples, but the present invention is not limited to these examples and may be applied to any electronic device that is capable of controlling the recording and display of content. For example, the present invention can be applied to a personal computer or a PDA, a portable telephone terminal or a portable image viewer, a printer apparatus, a digital photo frame, a music player, a game machine, an electronic book reader, a video player, and so on. The present invention may also be applied to a television apparatus, a projection apparatus, a tablet terminal, an AI speaker, a household appliance, an in-vehicle apparatus, a medical instrument, and so on.

Furthermore, the present invention is not limited to an image capture apparatus main body and may also be applied to a control apparatus that communicates with an image capture apparatus (including a network camera) by wired or wireless communication in order to control the image capture apparatus remotely. Apparatuses such as smartphones, tablet PCs, and desktop PCs may be cited as examples of an apparatus for remotely controlling an image capture apparatus. By transmitting commands to perform various operations and settings from the control apparatus side to the image capture apparatus on the basis of operations performed on the control apparatus side and processing performed on the control apparatus side, the image capture apparatus can be controlled remotely. Moreover, a live view image captured by the image capture apparatus may be received by wired or wireless communication and displayed on the control apparatus side.

According to the present disclosure, it is possible to record a plurality of content so that the content is managed favorably, and to display images representing the content favorably so that user-friendliness is improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention is not limited to the embodiments described above and may be subjected to various modifications and amendments without departing from the spirit and scope thereof. Accordingly, the following claims are attached in order to make the scope of the present invention public.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An electronic device comprising at least one memory and at least one processor which function as:
   a recording control unit configured to perform control to start recording content including at least one of a moving image and sound in response to an operation of a first operating member or a second operating member; and
   a control unit configured to perform control to:
   record the content as content of a new group that differs from a group of content recorded immediately prior thereto in a case where recording of the content is started in response to receipt of an operation of the first operating member; and
   record the content as content of the same group as the content recorded immediately prior thereto in a case where recording of the content is started in response to receipt of an operation of the second operating member.

2. The electronic device according to claim 1, wherein the control unit performs control so as to realize at least one of:
   recording information indicating the group of the content as attribute information of the content;
   recording information that indicates a correspondence relationship between the content and the group and is independent of the content; and
   recording the content in a separate folder for each group.

3. The electronic device according to claim 1, wherein,
   in a case where a predetermined recording mode for recording the content is set, the second operating member is enabled, and
   in a case where the predetermined recording mode is not set, the second operating member is disabled.

4. The electronic device according to claim 3, wherein the predetermined recording mode is a mode for recording a moving image of an operator him/herself or a mode for recording voice of the operator him/herself.

5. The electronic device according to claim 1, wherein, immediately after a recording mode for recording the content is set, the first operating member is enabled and the second operating member is disabled, and immediately after recording of the content is stopped, the first operating member is disabled and the second operating member is enabled.

6. The electronic device according to claim 1, wherein the first operating member and the second operating member are disposed further away than a display area in which display relating to recording of the content is performed, as seen from an acquisition portion for performing at least one of image capture of the moving image and input of the sound.

7. The electronic device according to claim 1, wherein an operating member for changing an AF position is disposed in a position enabling operation thereof by a finger used to operate the first operating member and the second operating member.

8. The electronic device according to claim 1, wherein the first operating member and the second operating member are disposed in positions that can be reached by a finger of a hand holding a grip portion of the electronic device.

9. The electronic device according to claim 1, wherein the at least one memory and the at least one processor further function as a playback unit configured to play back content in response to a user operation, and immediately after content is played back by the playback unit, in a case where recording of content is started in response to receipt of an operation of the second operating member, the control unit performs control to record the content to be recorded as content of the same group as the content played back immediately prior thereto.

10. The electronic device according to claim 1, wherein, in a case where an operation is performed on the first operating member while content of the same group as the content recorded immediately prior thereto is being recorded, the control unit performs modified control so that the content being recorded is recorded as content of a new group, and in a case where an operation is performed on the second operating member while content of a new group is being recorded, the control unit performs modified control so that the content being recorded is recorded as content of the same group as the content recorded immediately prior thereto.

11. The electronic device according to claim 1, wherein the recording control unit performs control to stop recording of the content in response to an operation of the first operating member or the second operating member during recording of the content.

12. The electronic device according to claim 1, wherein the recording control unit performs control so that while content of the same group as the content recorded immediately prior thereto is being recorded, recording of the content is not stopped in response to an operation of the first operating member and recording of the content is stopped in response to an operation of the second operating member, and while content of a new group is being recorded, recording of the content is not stopped in response to an operation of the second operating member and recording of the content is stopped in response to an operation of the first operating member.

13. The electronic device according to claim 1, wherein, in a case where an operation is performed on the first operating member while content of the same group as the content recorded immediately prior thereto is being recorded and in a case where an operation is performed on the second operating member while content of a new group is being recorded, the control unit performs control to delete the content being recorded.

14. The electronic device according to claim 1, wherein the at least one memory and the at least one processor further function as a display control unit configured to perform control so that in a case where recording of content of the same group as the content recorded immediately prior thereto is started, a display indicating a number of pieces of content belonging to the same group as the content recorded immediately before is performed.

15. The electronic device according to claim 1, wherein, after recording of the content is stopped, the control unit performs control to attach a rating to the content in response to an operation of an operating member for changing the AF position.

16. The electronic device according to claim 1, wherein the at least one memory and the at least one processor further function as a notification control unit configured to perform control to notify a user of whether content of a new group is being recorded or content of the same group as the content recorded immediately prior thereto is being recorded.

17. A control method of an electronic device, comprising: performing control to start recording content including at least one of a moving image and sound in response to an operation of a first operating member or a second operating member; and performing control to:

record the content as content of a new group that differs from a group of content recorded immediately prior thereto in a case where recording of the content is started in response to receipt of an operation of the first operating member; and record the content as content of the same group as the content recorded immediately prior thereto in a case where recording of the content is started in response to receipt of an operation of the second operating member.

18. A non-transitory computer readable medium that stores a program, wherein the program causes a computer to execute a control method of an electronic device, comprising:

performing control to start recording content including at least one of a moving image and sound in response to an operation of a first operating member or a second operating member; and performing control to:

record the content as content of a new group that differs from a group of content recorded immediately prior thereto in a case where recording of the content is started in response to receipt of an operation of the first operating member; and record the content as content of the same group as the content recorded immediately prior thereto in a case where recording of the content is started in response to receipt of an operation of the second operating member.

* * * * *